(12) United States Patent
Alber

(10) Patent No.: US 6,948,893 B2
(45) Date of Patent: Sep. 27, 2005

(54) CLAMPING SYSTEM COATED WITH SOLID LUBRICANT FOR MACHINE TOOLS

(75) Inventor: Roland Alber, Ritz (DE)

(73) Assignee: Dr. Joerg Guehring, Albstadt (DE)

( * ) Notice: Subject to any disclaimer, the term of this patent is extended or adjusted under 35 U.S.C. 154(b) by 0 days.

(21) Appl. No.: 10/327,742

(22) Filed: Dec. 23, 2002

(65) Prior Publication Data

US 2004/0120783 A1 Jun. 24, 2004

(51) Int. Cl.[7] .............................................. B23C 5/00
(52) U.S. Cl. .................. 409/234; 409/232; 408/239 R; 279/125; 279/158; 407/119
(58) Field of Search .................. 409/232, 234, 409/233; 408/239 R, 240, 238; 279/125, 158; 407/40, 119

(56) References Cited

U.S. PATENT DOCUMENTS

| | | | | |
|---|---|---|---|---|
| 3,955,259 A | * | 5/1976 | Gustafsson ................... | 407/40 |
| 5,322,303 A | * | 6/1994 | Nakamura .................... | 279/62 |
| 5,716,057 A | * | 2/1998 | Wright et al. ................ | 279/158 |
| 5,816,582 A | * | 10/1998 | Steadings et al. ............. | 279/62 |
| 5,965,253 A | * | 10/1999 | Rechberger et al. ......... | 428/336 |
| 6,284,366 B1 | * | 9/2001 | Konig et al. ................. | 428/336 |
| 6,521,349 B1 | * | 2/2003 | Konig et al. ................. | 428/469 |
| 6,528,171 B1 | * | 3/2003 | Endler et al. ................ | 428/469 |
| 6,705,184 B2 | * | 3/2004 | Cardemon et al. ............ | 82/1.11 |

FOREIGN PATENT DOCUMENTS

| | | | |
|---|---|---|---|
| DE | 2415255 A1 | * | 10/1975 |
| DE | 202898 A | * | 10/1983 |
| DE | 37 41 549 A1 | | 6/1988 |
| EP | 0 542 165 A1 | | 5/1993 |
| GB | 1 354 199 | | 5/1974 |
| JP | 62-79932 A | * | 4/1987 |

* cited by examiner

Primary Examiner—Erica Cadugan
(74) Attorney, Agent, or Firm—Boyle Fredrickson Newholm Stein & Gratz S.C.

(57) ABSTRACT

The invention relates to a clamping system as a point of separation inside a tool or workpiece support system, or as an interface between a tool or workpiece support system and a machine tool for the detachable, non-positive connection of two clamping system parts. According to the present invention, it is proposed to coat at least one joining surface of a joining surface pairing between components of the clamping system parts that are to be connected in non-positive fashion with a layer of solid lubricant applied in an abrasion-resistant manner. On the one hand, this coating with solid lubricant enables significant improvement in the sliding characteristics of the joining surfaces, subjected to friction, of the components of the clamping system to be connected with one another. On the other hand, the joining surfaces, which are in addition subjected to a high surface pressure, exhibit improved corrosion characteristics. These characteristics ensure the required positional accuracy of the two clamping system parts, even in the case of tool or workpiece support systems rotating at high speed.

7 Claims, 3 Drawing Sheets

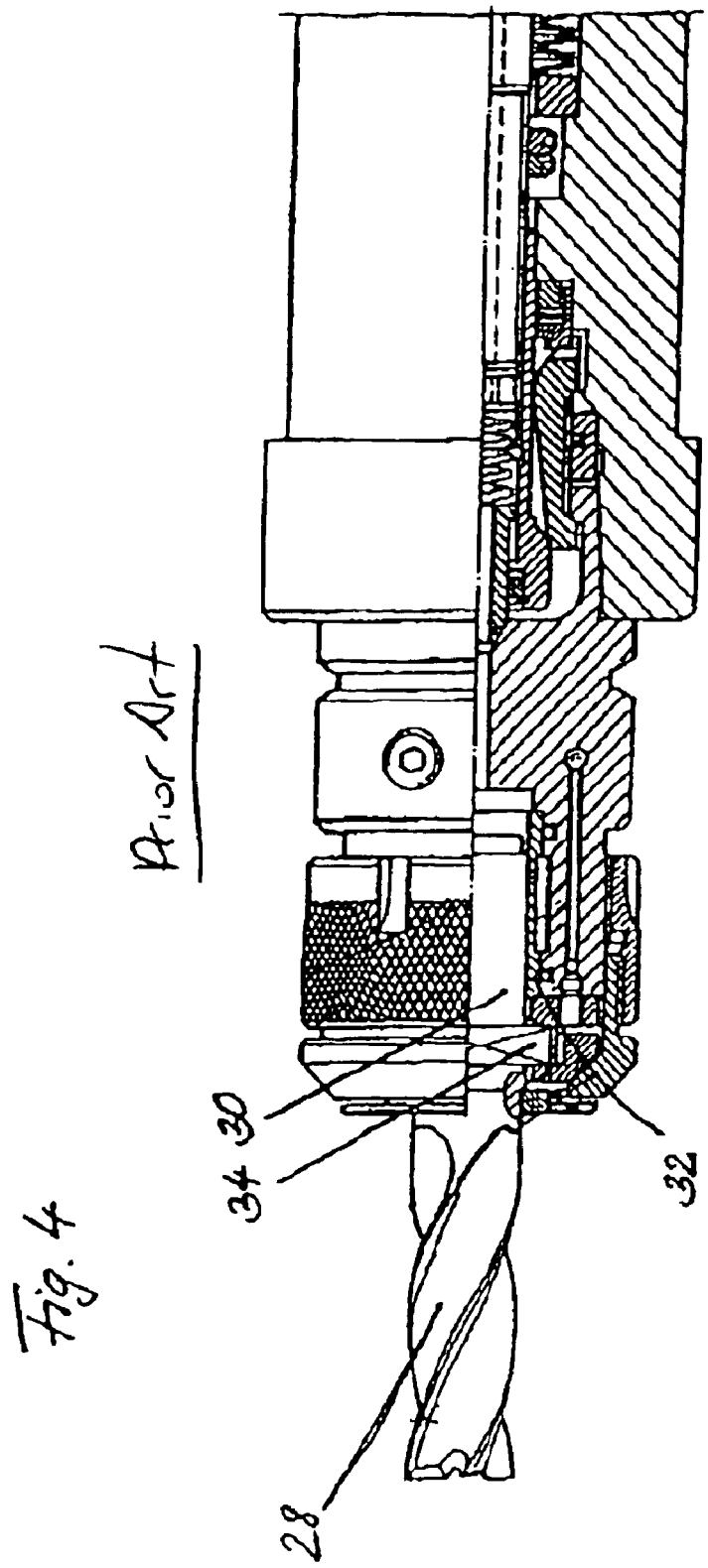

US 6,948,893 B2

CLAMPING SYSTEM COATED WITH SOLID LUBRICANT FOR MACHINE TOOLS

BACKGROUND OF THE INVENTION

1. Field of the Invention

The present invention relates to a clamping system for machine tools, for the detachable, non-positive connection of two clamping system parts as a point of separation within a modularly constructed workpiece holding system or tool holding system, or as an interface between a workpiece support system or tool support system and a machine tool spindle.

2. Discussion of Related Art

The use of modern, regulated machine tools having drive systems for high machining speeds enables a significant increase in productivity through a reduction of machining times, due to an increase in cutting and advance speeds. In general, the drive technology for the main drives of machine tools meets the demands of high rotational speed, rotational rigidity, and dynamics made by high-speed machining. For example in cutting, new cutting materials such as oxide ceramics and polycrystalline diamond enable significantly higher cutting speeds, so that these machine tool components allow high-speed machining, with cutting speeds of, for example, 500 to 10,000 meters per minute in machining operations. However, the maximum machining speeds that can be achieved are determined by the forces that act on the tool or workpiece at these high cutting speeds, and by the safety aspects that must be taken into account in this context.

Thus, high demands are placed both on the machine tool spindle bearing system and on the workpiece support system or tool support system, as a weak point in the force transmission path from the machine tool to the tool or workpiece. In particular in clamping systems for rotating tools or workpieces, the highest degree of precision is required, because at the rotational speeds that are standard today of up to 30,000 RPM, very large forces occur, and even the slightest imbalances can destroy the sought precision in machining, or can fail to meet the required safety standards. Besides a high static rigidity, and a high dynamic rigidity in the case of rotating tool or workpiece systems, the demands made on a workpiece or tool clamping system include high-speed capacity and a high repeat accuracy given an automatic changing of tools or workpieces.

Clamping systems in the sense of the present invention are standardly distinguished in that one of the two clamping system parts to be connected has a cylindrical or conical hollow shaft, and the other part has a correspondingly formed receiving section in order to receive the hollow shaft with a precise fit. A clamping device situated concentrically in the receiving section is used for the clamping of the two clamping system parts that are to be connected.

Thus, for example, from DE 4220873 A1 a modular clamping system is known having a clamping device in the form of a system of clamps, via which the hollow shaft of the one clamping system part is drawn into the receiving section of the other clamping system part, producing a high surface pressure between the joining surfaces of the hollow shaft and of the receiving section, and also between end surfaces of the two clamping system parts that are to be coupled. The system of clamps has in particular a clamping element that can be attached in the receiving section, which, in the joined state of the clamping system parts, extends into the hollow shaft up to a point near an inner shoulder, and has a radial recess in which two clamping elements are received. Using an operating element, the clamping elements can be forcibly moved, in opposite directions, into and out of engagement with an undercut clamping shoulder of the hollow shaft through a radial opening in the hollow shaft and in the receiving section.

Another known clamping system, as described for example in the document DE 3807140 C2, includes a clamping device having a plurality of clamping claws that are distributed uniformly over the periphery thereof, and are situated loosely, or at least are not uniquely fixed, these claws being attached in positively locking fashion in the receiving section, and being brought to rest on an undercut clamping shoulder formed in the hollow shaft.

In addition, DE 19753663 A1 discloses a clamping system having a clamping device in the form of a clamping tongue or clamping fork, which, in the joined state of the two parts, extends into the hollow shaft of the one part, and has at least two clamping elements that can be moved in opposite directions, as well as an actuating device that drives the clamping elements. Here, the clamping elements can be brought into and out of engagement with an undercut clamping shoulder of the hollow shaft. The clamping elements are realized as head segments of oblong clamping elements situated essentially parallel to the longitudinal axis, or axis of rotation, of the receiving section, the foot segments thereof being connected with one another.

Recently, the hollow shaft cone clamping system has proven successful because it offers the advantage that, in the joined state of the two clamping system parts, depending on the embodiment the clamping elements used for the clamping, i.e., the clamping bodies or clamping claws, ensure not only that a sufficient surface axial pressure is produced between the end surfaces of the two clamping system parts to be connected, but also that the hollow shaft experiences a certain radial expansion. In this way, the precision of fit between the hollow shaft and the receiving section, as well as the radial positioning accuracy, i.e., the axial alignment, of the two clamping system parts is improved. Precision of fit and accuracy of positioning are the characteristics which a clamping system must have with respect to stability, i.e., static and dynamic rigidity, at high machining speeds in particular.

However, it has turned out that in particular given the constantly increasing rotational speeds, a stable and axially aligned clamping of the two clamping system parts that are to be connected becomes increasingly difficult. The cause for this is the fact that the very high rotational speeds cause the centrifugal forces to increase considerably, so that the clamping forces, which provide the fixing of the two clamping system parts and the transmission of torque, decrease. On the one hand, an increase of the clamping forces is possible only up to predetermined load limits, and on the other hand, as the kinetic energy stored in the clamping system increases the safety risks also increase. Thus, the joining surfaces of the receiving section and of the hollow shaft, and also the end surfaces and the clamping surfaces in the joined state of the two clamping system parts, must be manufactured with greater precision in particular for rotating tools, in order to achieve a seating that is as precise as possible of the hollow shaft in the receiving section, and thereby a stable clamping.

Despite numerous measures aimed at meeting these increasing demands (for example, improved materials have been used, devices have been proposed for monitoring the machining and for correcting the tool settings, etc.), it has nonetheless been observed that, in particular for the case of automatic tooling systems, the high demands placed on a clamping system are not met in such a way as to achieve the sought positioning accuracy of the two clamping system parts to be connected, and the static and dynamic rigidities required at high machining speeds.

SUMMARY OF THE PRESENT INVENTION

The present invention is therefore based on the object of providing a modular clamping system for machine tools having the constructive designs explained above, in which the sought requirements with respect to static and dynamic rigidity are fulfilled.

This object is achieved by the clamping system having the features of the present invention.

In connection with investigations concerning the causes of the problems explained above, it was determined that the requirements according to the problem posed above are met by a clamping system in which at least one of the two joining surfaces of a pair of joining surfaces of two (standardly metallic) components responsible for the non-positive connection of the clamping system parts is coated with a layer of solid lubricant, applied in abrasion-resistant fashion. The coating with solid lubricant enables significant improvement of the sliding characteristic of the joining surfaces, which are subject to friction, of the components of the clamping system that are to be connected with one another. At the same time, the joining surfaces, which are additionally subject to high surface pressure, exhibit improved corrosion characteristics. The designation "joining surfaces" refers to those surfaces or surface regions of arbitrary components of the two clamping system parts that slide on one another, in a manner subject to friction, during the joining of the two clamping system parts, or those surfaces or surface regions that abut on one another with a (high) surface pressure in the clamped state of the clamping system. Thus, according to the present invention it is not necessary to coat the entire surface of those components possessing the joining surfaces. Rather, it is sufficient to coat only those surface areas that experience surface pressure in the clamped state of the clamping system, i.e., the actual joining surfaces.

The improvements that were noted are based in particular on the following observations or considerations. It was observed that in conventional hollow shaft clamping systems, as a result of manufacturing tolerances both for the receiving section and also for the hollow shaft, the two parts to be connected, in particular in automatic tool changing systems, often cannot be brought into an absolutely precise coaxial situation with respect to one another. This "oblique positioning" can also be amplified, on the one hand, due to the fact that, as the result of a non-uniform distribution of lubricant (resulting for example from a stripping off of the lubricant applied on the joining surfaces, e.g., the cone or hollow-shank short-taper surfaces of the hollow shaft and of the receiving section, when there is a relative sliding motion), local concentrations of lubricant arise on the joining surfaces; in particular if there are abrasive particles or other impurities contained in the lubricant, this can easily cause a deviation (even if only a slight one) of the center axes or axes of rotation of the components clamped with one another. This holds both for rotating and for stationary clamping systems. On the other hand, in rotating clamping systems lubricant collects in hollow spaces, which even in small quantities can cause difficulties with respect to the sought machining precision, due to the fact that even minimal concentrations of mass cause significant imbalances.

In addition, the non-uniform distribution of lubricant on the joining surfaces between the hollow shaft and the receiving section results in locally differing coefficients of friction or sliding properties of the joining surfaces. Thus, those regions of the joining surfaces on which less lubricant is present due to the non-uniform distribution of lubricant are exposed to increased friction. In particular in clamping systems having rotationally symmetrical construction, this circumstance can result in a distribution of the axial clamping force exerted on the two clamping system parts that is not uniform with respect to the center axes or axes of rotation, and thus in a slight axial displacement of the center axis or axis of rotation of the two clamping system parts with respect to one another. At high rotational speeds, wobbling motions or imbalances can thus arise, so that an optimal true running of the tool or workpiece is no longer ensured. However, in stationary clamping systems as well, a displacement (even if only a slight one) of the tool edge can destroy the sought machining precision.

As already mentioned, in clamping systems the two clamping system parts to be connected are connected with one another with the aid of clamping elements. These are provided with clamping surfaces which are applied on the one hand on the first clamping system part and on the other hand on the second clamping system part, and which effect the clamping. The clamping surfaces are situated on ends opposite one another of the clamping elements, so that in the clamped state of the interface or point of separation, axial tensile forces are built up inside the clamping elements. If differences of spacing of the clamping surfaces occur here (which, apart from the manufacturing tolerances present in any case, could also be the result of wearing of the clamping surfaces due to insufficient lubrication, or the result of a "material coating" on the clamping surfaces due to impurities contained in the lubricant), then different forces are built up during the clamping of the parts allocated to the interface or point of separation, resulting in displacements of the two center axes or axes of rotation of the tool parts clamped with one another. The alignment of the clamping system parts clamped with one another is therefore no longer ensured. In addition, when there is a change of one of the two clamped parts, previously set measurements may no longer be maintained. These negative effects occur in particular in tool support systems or workpiece support systems designed for high rotational speeds, due to the high centrifugal forces that occur there.

In view of these disadvantages caused by the use of lubricant, or by a non-uniform coating of lubricant on the joining surfaces, one might consider doing entirely without lubricant. However, in this case a high axial force would have to be applied in order to overcome the frictional forces that occur when there is a relative movement of the joining surfaces or clamping surfaces of the two clamping system parts, and to ensure a reliable and solid clamping. In addition, due to different surface roughnesses of the joining surfaces or clamping surfaces, a non-uniform distribution of the applied axial force with respect to the center axes or axes of rotation would be bound to occur.

In addition, in modular clamping systems of this sort phenomena of corrosion have been noted in particular on the non-positively paired joining surfaces, i.e., on the fitting surfaces, but also on the clamping surfaces of the clamping elements and on the corresponding countersurfaces of the clamping system parts. Corrosion results in a wearing of the joining surfaces or clamping surfaces, and is thus one of the causes of the problems described above.

The solution according to the present invention, according to which at least one of the two joining surfaces of a pair of joining surfaces between the components responsible for a non-positive connection of two clamping system parts is coated with a layer of solid lubricant applied in abrasion-resistant fashion, reduces on the one hand the coefficient of friction, and thus the wear due to friction of the joining surfaces that slide on one another. On the other hand, the better sliding characteristics of the frictional surfaces enable a closer contact, and thus a stronger clamping, of the two clamping system parts that are to be connected. In this way, the required positional accuracy of the two clamping system parts is ensured. In addition, the clamping system according to the present invention makes it possible to do entirely without the use of an additional lubricant. In tool support systems or workpiece support systems rotating at high speeds, these advantageous characteristics contribute decisively to the result that the imbalance problems previously encountered due to a non-aligned situation of the two joined clamping system parts now no longer occur. The inventive clamping system is advantageous in particular for automatic tool changing systems or workpiece changing systems, because the advantageous characteristics described above enable particular tool settings to be repeated to a higher degree than was the case in conventional clamping systems. The clamping system according to the present invention thus permits, due to an improvement of the sliding characteristics, a lower-loss conversion of the axial drawing force, resulting in a high static rigidity, and in addition a high dynamic rigidity in rotating workpiece support systems or tool support systems, of the spindle-tool system. In this way, in rotating systems there results a more optimal true running of the tool, meeting the demands of precision in fine machining.

In addition, it has turned out, surprisingly, that the joining surfaces subjected to a high surface pressure were less susceptible to corrosion than were the joining surfaces lubricated in a conventional fashion using a lubricant, e.g. grease, graphite, or oil. This positive result can be attributed to the fact that a direct metal-metal contact between the joining surfaces, end surfaces, or clamping surfaces of the standardly metallic clamping system parts is avoided, and thus no local weldings can occur.

The joining surfaces, subject to surface pressure, of the clamping system parts to be connected preferably have surface coatings made up of at least one compound of at least one of the main elements of the sixth group of the periodic table on the one hand, and of at least one of the subgroup elements of the fifth and sixth groups of the periodic table on the other hand. Main elements of the sixth group include: O, S, Se, and Te. Subgroup elements of the fifth and sixth groups include V, Nb, Ta, Cr, Mo, and W. Typical representatives of the compounds suitable for the coating are: $MoS_2$, $NbS_2$, $TaS_2$, $WS_2$, $MoSe_2$, $NbSe_2$, $TaSe_2$, $WSe_2$, $MoTe_2$, $NbTe_2$, $TaTe_2$, and $WTe_2$, or mixed compounds thereof. The coating materials are known lubricants, preferably deposited according to the PVD (Physical Vapor Deposition) system. The layer of solid lubricant is preferably made of molybdenum sulfide ($MoS_2$), which can also be deposited on the respective joining surfaces according to the PVD method. In physical deposition according to the PVD method, thin layers are deposited at relatively low process temperatures, lower than 550EC, through cathode sputtering. The method causes no deformation on the components to be coated, thus making subsequent treatment superfluous. An installation of the closed field unbalanced magnetron type has proven particularly suitable for the deposition of $MoS_2$ layers and the like in the manufacture of the clamping systems according to the present invention. With such an installation, at low gas pressure a high degree of ionization can be achieved, resulting in the formation of compact layers having good adhesion. Also, the layer composition can be optimally controlled and monitored with this multiply magnetic system. $MoS_2$, long known as a lubricant, is (with a Mohs hardness of 1–2) a very soft material, and has a very low coefficient of friction. The layer thickness is preferably in the range of 0.1–1.0 $\mu$m.

Alternatively, a surface coating of the respective joining surfaces can take place using a hard material and solid lubricant layer system as indicated in letters patent DD 202 898 (VEB Uhrenwerke Ruhla); in this way, the hardness that can be achieved with the hard material layer is added to the reduction of the coefficients of friction that can be achieved by the layer of solid lubricant. TiC is preferably used as the material for the hard material layer.

Alternatively, a solid lubricant layer system made up of a layer of solid lubricant (preferably $MoS_2$) to be applied onto the joining surfaces to be coated, and a plastic layer (such as for example polytetrafluorethylene (PTFE)) applied on the solid lubricant layer, can also be applied, forming a highly lubricating sliding zone in the area of transition of the two layers.

The inventive clamping system, having a coating of solid lubricant of non-positively paired joining surfaces can be used generally for clamping systems of arbitrary design, i.e., both for clamping systems for rotating tool or workpiece support systems and for clamping systems for stationary tool or workpiece support systems. In addition, the inventive clamping system can be used as an interface to be received directly in machine tool spindles, or as a point of separation inside a tool or workpiece support system. With respect to the concrete realization of such clamping systems, reference is made to the documents cited and acknowledged above.

BRIEF DESCRIPTION OF THE DRAWINGS

In the drawings, various exemplary embodiments of the clamping system according to the present invention are shown schematically.

FIG. 4 shows a high-speed cutting precision (HSCP) tool holding fixture, having expansion chuck technology and axial clamping;

DETAILED DESCRIPTION OF THE PREFERRED EMBODIMENTS

Figure 1:
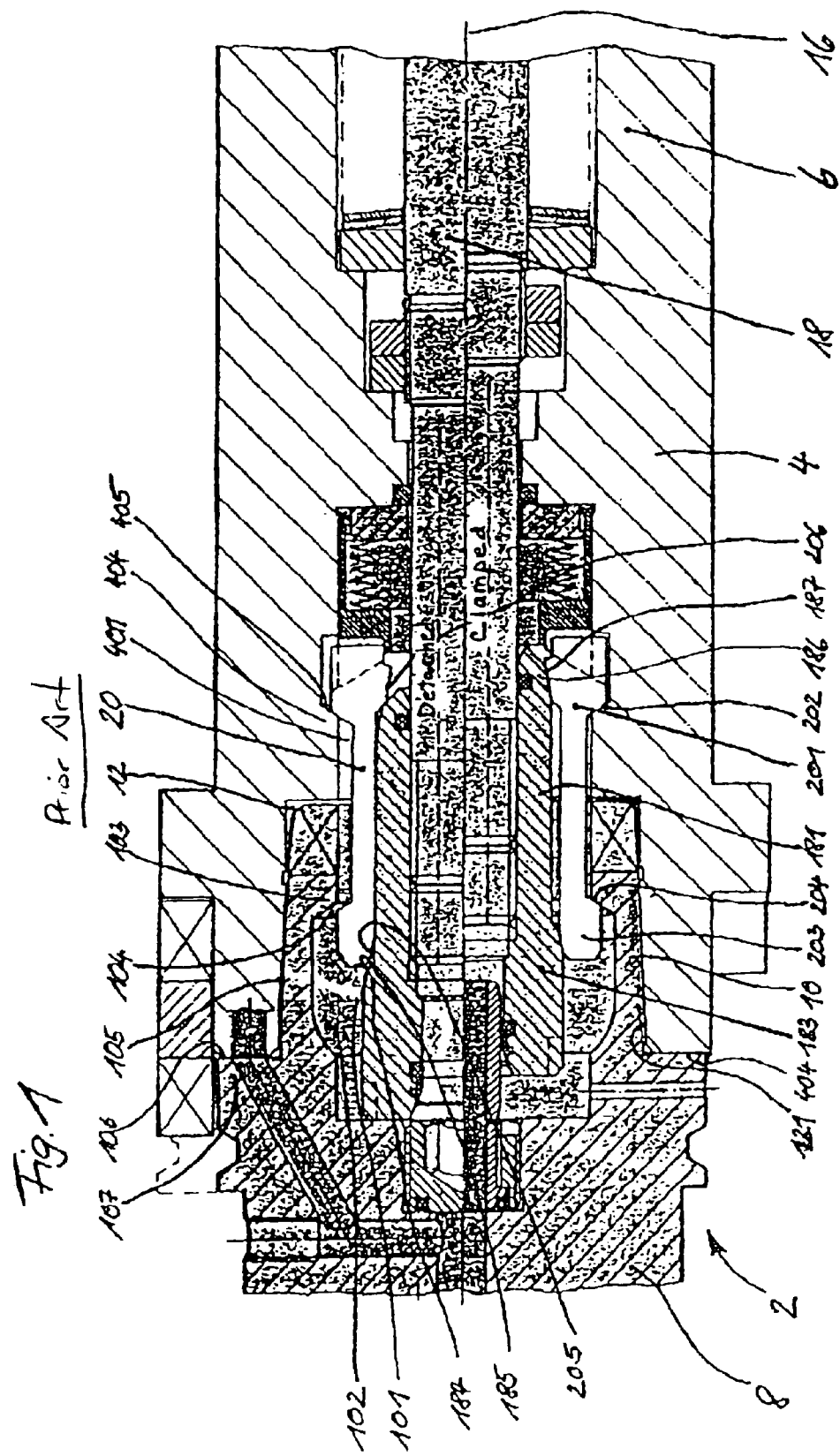
FIG. 1 shows a hollow shaft cone clamping system as an interface between a rotating machine or workpiece support system and a machine tool spindle, having automatic central drawbar clamping.

FIG. 1 shows the clamping system according to the present invention as an interface 2 between a clamping shaft 4 of a machine tool spindle 6 and a tool support or workpiece support 8. The upper half of FIG. 1 shows the detached state of interface 2, while the lower half of FIG. 1 shows the clamped state thereof. Tool or workpiece support 8 has a fitting pin 10 that is introduced into an opening 12 formed on the end surface in clamping shaft 4. Here, the inner diameter of opening 12 is selected such that fitting pin 10 can be introduced essentially without play.

Fitting pin 10 is formed as a hollow shaft, and surrounds an open space 101 having a circumferential annular groove 102 and an annular shoulder 103 that limits this groove, having an inner cone surface 104. This surface acts as a clamping surface, and runs at an angle to axis of rotation or center axis 16. The angle can be defined within a broad range. It is essential that surface 104 of annular shoulder 103 forms a seating surface for clamping elements 20 (described below). Jacket surface 105 of fitting pin 10 is formed as a cone surface, which in the clamped state of interface 2 is paired (as can be seen in FIG. 1) in non-positive fashion with a corresponding inner cone surface 121 of opening 12 of clamping shaft 4.

Clamping shaft 4 is thus likewise of hollow construction. In inner space 401, connected to opening 12, of clamping shaft 4, there is situated a drawbar 18 that can be moved in the direction of axis of rotation or center axis 16; in the joined state of tool or workpiece support 8 and clamping shaft 4, this drawbar extends into open space 101 of fitting pin 10. On the end segment of drawbar 18 at left in FIG. 1, there is situated a draw cone 181 whose end segment 183 at left in FIG. 1 has an annular shoulder 184 that is preferably circumferential in construction, having a seating surface 185 for clamping elements 20, onto which clamping elements 20 run, via oblique surfaces 205 provided on their end segments 203 at left in FIG. 1, when there is an actuation of drawbar 18. Similarly, end segment 186, at the right in FIG. 1, has a seating surface 187 onto which clamping elements 20 run via oblique surfaces 206 provided at their end segments 201, which are at the right in FIG. 1. Inner space 401 of clamping shaft 4 has an annular shoulder 404 having a preferably circumferential seating surface 405 for clamping elements 20.

On the outer periphery of draw cone 181 of clamping bar 18, a plurality of receiving pockets that are distributed over the periphery and that run in the direction of axis of rotation or center axis 16 can be formed, in which clamping elements 20 are received. Here, clamping elements 20 are situated so as to be capable of sliding motion into the receiving pockets both in the direction of axis of rotation or center axis 16 and also radially thereto. Clamping elements 20, which are formed in the manner of claws or pincers, as can be seen in FIG. 1, are pressed against the outer periphery of draw cone 181 of drawbar 18, or against the base of the receiving pockets (not shown) by elastic retaining devices (not shown), preferably formed as elastic rings.

Given an actuation of drawbar 18 from the position shown in the upper half of FIG. 1 into the position shown in the lower half of FIG. 1, clamping elements 20 (which, as can be seen in FIG. 1, are supported against a displacement to the right on a spring pre-stressed return stroke mechanism 30) run, at their left oblique surfaces 205 and right oblique surfaces 206, onto the left or right seating surface 185,187 of draw cone 181. In this way, clamping elements 20 are pressed radially outwards. Here, clamping elements 20 run, at their left clamping surfaces 204, onto seating surface 104 of annular shoulder 103 of fitting pin 10, and, at their right clamping surfaces 202, onto seating surface 405 of annular shoulder 404 of inner space 401 of clamping shaft 4, and thereby effect a clamping of tool or workpiece support 8 and clamping shaft 4. During the clamping, fitting pin 10 experiences an axial draw force acting to the right in FIG. 1, which draws it into opening 401 of clamping shaft 4.

Between cone jacket surface 105 of fitting pin 10 and inner cone surface 121 of clamping pin 4, there thus arises a high degree of surface pressure. The drawing motion of clamping pin 10 into clamping shaft 4 is terminated when an end surface 106 that limits cone jacket surface 105, said end surface being formed on an annular shoulder 107 of tool or workpiece support 8, comes to be seated on an end surface 404 provided on the end of clamping shaft 4, so that a high degree of surface pressure also arises between these end surfaces 105, 404.

Concerning further features relating to the construction and functioning of interface 2 described above, reference is made to the brochure "Bohrmeister," number 36/91, published in May 1991 by the applicant of the instant patent application.

This interface 2, realized as a hollow shaft cone clamping system, ensures not only a sufficient axial surface pressure between end surfaces 106, 404, but also a certain radial expansion of clamping shaft 4 that receives fitting pin 10. In this way, on the one hand a high precision of fit is created between fitting pin 10 and clamping shaft 4, and on the other hand the radial positioning accuracy, i.e., the axial alignment, of these two components is improved.

According to the present invention, at least one of the two paired joining surfaces between the components that are to be connected in non-positive fashion of tool or workpiece support 8 and of clamping shaft 4 is preferably coated with a layer of solid lubricant, applied in an abrasion-resistant manner. Joining surface pairings in which at least one of the two joining surfaces can be coated with a layer of solid lubricant applied in abrasion-resistant fashion, include:

cone jacket surface 105 of fitting pin 10 and inner cone surface 121 of opening 12 of clamping shaft 4;

clamping surfaces 204 of clamping elements 20 and seating surface 104 on annular shoulder 103 of fitting pin 10;

clamping surfaces 202 of clamping elements 20 and seating surface 405 on annular shoulder 404 in inner space 401 of clamping shaft 4;

end surface 106 of fitting pin 10 and end surface 404 of clamping shaft 4; and seating surfaces 185 and 187 on draw cone 181, and oblique surfaces 205 and 206 on the left or right end segment 203 or 201 of clamping element 20.

Given a non-positive clamping of tool or workpiece support 8 and clamping shaft 4, the joining surfaces named above experience a relative motion, and are subjected to friction. In addition, in the clamped state they are subjected to a high degree of surface pressure.

Figure 5A:
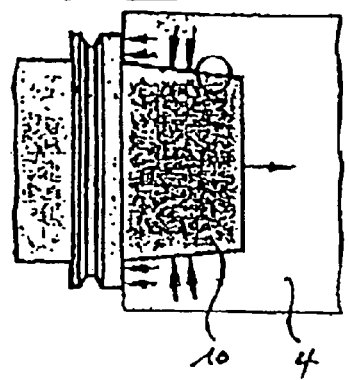
FIG. 5a shows a schematic view for the representation of the surface pressures on a hollow shaft cone fitting pin with planar seating, clamped in a clamping shaft of a machine tool spindle.

Through the coating according to the present invention of at least one of the two joining surfaces of the joining surface pairings with a layer of solid lubricant applied in abrasion-resistant fashion, the coefficient of friction, and therewith the wear due to friction of the joining surfaces that slide against one another and are subjected to friction, are reduced. Due to the improved sliding characteristics, a closer contact and a stronger clamping are achieved between fitting pin 10 and opening 12, and thus between tool or workpiece support 8 and clamping shaft 4. The solid lubricant coating according to the present invention thus contributes to a higher degree of positioning accuracy, i.e., axial alignment, of the two components of the interface. Due to a more uniform distribution of axial force over the periphery of the cone jacket surface of fitting pin 10 (thanks to the lower coefficients of friction of the joining surfaces, and, correspondingly, a uniform surface pressure between the end surfaces, as is indicated schematically by the arrows in FIG. 5a), an extremely precise axial alignment of the two interface components is ensured. In this way, the clamping system according to the present invention is advantageously suited for automatic tool changing or workpiece changing systems, because, with the advantageous characteristics described above, particular tool settings are repeatable to a high degree.

In addition, the use of a lubricant, for example oil or grease, is no longer required. In particular in tool or workpiece support systems that rotate with a high speed, the danger of imbalance due to accumulations of lubricant distributed in a rotationally asymmetrical manner is thus significantly reduced.

The inventive clamping system thus permits a high degree of static rigidity, and in addition a high degree of dynamic rigidity in rotating workpiece or tool support systems, of the system made up of the machine tool spindle and the tool/workpiece. In rotating systems, this results in an optimal true running of the tool, which meets the demands of precision for fine machining.

Due to the fact that a direct metal—metal contact between the joining surfaces, end surfaces, and/or clamping surfaces of the metallic interface components is avoided, in addition the risk of local weldings is considerably reduced. Thus, a low proportion of phenomena of corrosion is found on the joining surfaces or clamping surfaces subjected to a high degree of surface pressure.

The joining surfaces of the clamping system parts to be connected, which are subjected to a high degree of surface pressure and are subject to friction, preferably have surface coatings made of at least one compound of at least one of the main elements of the sixth group of the periodic table on the one hand, and of at least one of the subgroup elements of the fifth and sixth groups of the periodic table on the other hand. Main elements of the sixth group of the periodic table include: O, S, Se, and Te. Subgroup elements of the 5th and 6th groups of the periodic table include V, Nb, Ta, Cr, Mo, and W. Typical representatives of the compounds suitable for the coating are: $MoS_2$, $NbS_2$, $TaS_2$, $WS_2$, $MoSe_2$, $NbSe_2$, $TaSe_2$, $WSe_2$, $MoTe_2$, $NbTe_2$, $TaTe_2$, and $WTe_2$, or mixed compounds thereof. The coating materials are known lubricants, preferably deposited according to the PVD (Physical Vapor Deposition) system. The layer of solid lubricant is preferably made of molybdenum sulfide ($MoS_2$), which can also be deposited on the respective joining surfaces according to the PVD method. In physical deposition according to the PVD method, thin layers are deposited at relatively low process temperatures, lower than 550° C., through cathode sputtering. The method causes no deformation on the components to be coated, thus making subsequent treatment superfluous. An installation of the closed field unbalanced magnetron type has proven particularly suitable for the deposition of $MoS_2$ layers and the like in the manufacture of the clamping systems according to the present invention. With such an installation, at low gas pressure a high degree of ionization can be achieved, resulting in the formation of compact layers having good adhesion. Also, the layer composition can be optimally controlled and monitored with this multiply magnetic system. $MoS_2$, long known as a lubricant, is (with a Mohs hardness of 1–2) a very soft material, and has a very low coefficient of friction.

Figure 5B:
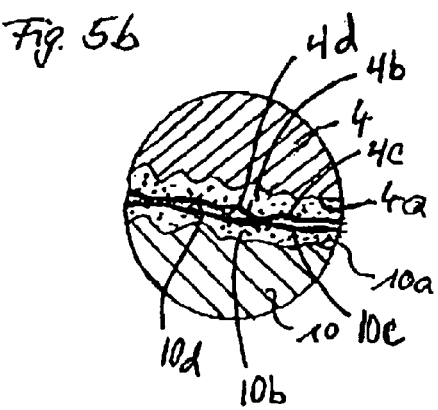
FIG. 5b shows the section circled in FIG. 5a of the joining surface pairing between the hollow shaft cone of the fitting pin and the inner cone of the receiving section, in a larger scale.

The layer thickness is in the range of the respective limits of tolerance for the surface roughness of the joining surfaces, and is preferably in the range of 0.1–1.0 μm. FIG. 5b schematically shows the section circled in FIG. 5a of the joining surface pairing between the hollow shaft cone of a fitting pin 10 and the inner cone of a receiver section 4, in a larger scale. In the example shown in FIG. 5b, both joining surfaces 10a, 4a, are coated with a layer of solid lubricant 10c, 4c, made for example of $MoS_2$, the layer thickness being approximately in the range of the depth of roughness of the joining surfaces; e.g., given finely milled surfaces, approximately 0.4 to 0.6 μm.

In the example shown, both joining surfaces of the joining surface pairings between components 10, 4 of the clamping system that are to be connected in non-positive fashion are coated with a layer of solid lubricant 10c, 4c deposited in abrasion-resistant fashion. However, the underlying object of the invention would also be achieved if only one of the two joining surfaces of the joining surface pairing were coated.

Alternatively to the coating with solid lubricant proposed above, a surface coating of the respective joining surfaces using a hard material and solid lubricant layer system can also take place in accordance with the disclosure found in letters patent DD 202 898 (VEB Uhrenwerke Ruhla); in this way, the hardness that can be achieved with the layer of hard material 4b, 10b is added to the reduction of the coefficients of friction that can be achieved by the layer of solid lubricant 4c, 10c. TiC is preferably used as the material for the layer of hard material 4b, 10b.

Alternatively, however, a solid lubricant layer system made up of a layer of solid lubricant 4c, 10c (preferably $MoS_2$) to be applied onto the joining surfaces to be coated, and a plastic layer 4d, 10d (such as for example polytetrafluorethylene (PTFE)) applied on the solid lubricant layer, can also be applied, forming a highly lubricating sliding zone in the area of transition of the two layers.

Figure 2:
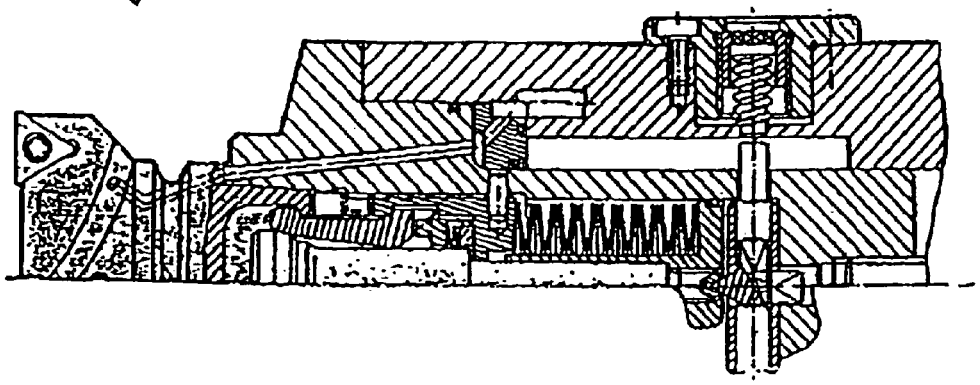
FIG. 2 shows a hollow shaft cone clamping system as a point of separation between a stationary rotating tool and a tool support having automatic lateral clamping.
Figure 3:
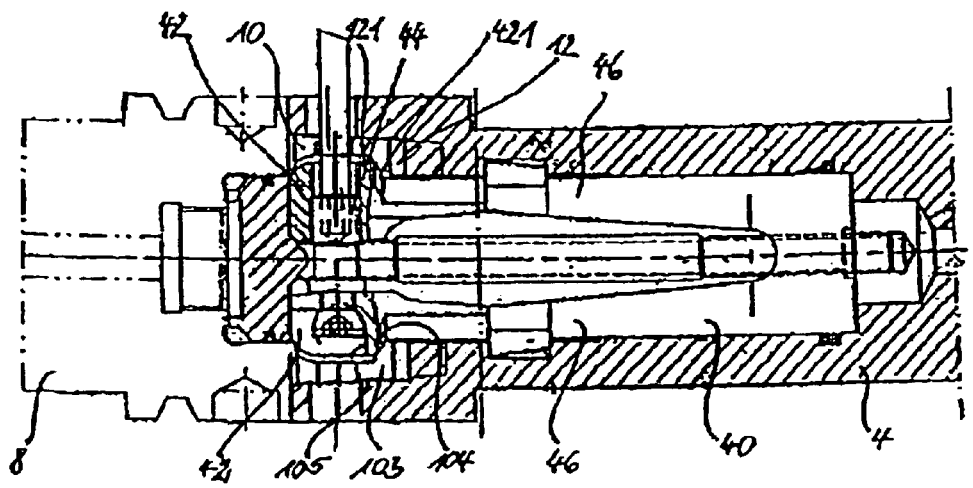
FIG. 3 shows a collet chuck clamping system as an interface between a rotating tool or workpiece support system and a machine tool spindle, having manual lateral clamping.

FIGS. 2 to 4 show alternatives to the interface clamping system described above. FIG. 2 shows a clamping system for use as a point of separation between a rotating tool in operation and a tool support, having automatic lateral clamping. In its design and in its function, this clamping system essentially corresponds to the clamping system shown in FIG. 1. Thus, the joining and clamping surfaces coated with solid lubricant in the clamping system according to FIG. 2 also correspond to the joining and clamping surfaces of the clamping system according to FIG. 1.

FIG. 3 shows a pincer clamping system as an interface between a rotating tool or workpiece support system and a machine tool spindle, having manual lateral clamping, as known from DE A1 19753663 and already explained above. This clamping system includes a clamping device 40 in the form of a clamping pincer or clamping fork, which, in the joined state of the two clamping system parts 4, 8, extends into fitting pin 10, realized as a hollow shaft cone, of the one tool or workpiece support 8, and has at least two clamping elements 42 that can be moved in opposite directions, as well as an actuating device 44 that drives clamping elements 42. Here, clamping elements 42 can be brought into and out of engagement with an undercut annular shoulder 103 of fitting pin 10. Clamping elements 42 are realized as head segments of oblong clamping elements 46 situated essentially parallel to the longitudinal axis, or axis of rotation, of the receiving section, the foot segments thereof being connected with one another, e.g. in the form of a material joint. In this clamping system, cone jacket surface 105 of fitting pin 10 and/or inner cone surface 121 in opening 12 of clamping shaft 4 are preferably coated with a layer of solid lubricant. Advantageously, clamping surfaces 421, supported on seating surface 104 of annular shoulder 103 of fitting pin 10, also have a layer of solid lubricant on head segments 42 of clamping elements 46 and/or seating surface 104 of annular shoulder 103.

In the high-speed cutting precision (HSCP) tool holding fixture with expansion chuck technology and axial clamping, shown in FIG. 4, the jacket surface of cylinder shaft 30 of boring tool 28, and the cylindrical inner surfaces of expansion clamping chuck 32, are preferably coated with a layer of solid lubricant applied in an abrasion-resistant manner. In addition, the annular end surfaces provided on the end of tool collar or flange 34 can be coated.

In modifications of the clamping systems explained above, alternatively to a pure layer of solid lubricant on the respective surfaces to be coated, a system of layers of hard material and solid lubricant can also be deposited, corresponding to letters patent DD 202 898 (VEB Uhrenwerke Ruhla). In this way, the coated surface gains the hardness that can be achieved with the hard material layer in addition to the reduction of the coefficients of friction that can be achieved with the layer of solid lubricant. TiC can for example be used as the material for the hard material layer.

Alternatively, a solid lubricant layer system made up of a layer of solid lubricant (preferably made of $MoS_2$) to be applied on the joining surfaces to be coated and a plastic layer (such as for example PTFE) applied on the layer of solid lubricant, can be applied, forming a highly lubricating sliding zone in the area of transition of the two layers.

Although the best mode contemplated by the inventor of carrying out the present invention is disclosed above, practice of the present invention is not limited thereto. It will be manifest that various additions, modifications and rearrangements of the features of the present invention may be made without deviating from the spirit and scope of the underlying inventive concept.

In addition, other suitable solid lubricant layers, or other suitable layer systems, can be applied on the joining surfaces to be coated. The essential factor is only that the coating takes place in an abrasion-resistant manner, and effects an improvement of the sliding characteristics, as a precondition for high static and dynamic characteristics of the clamping system.

What is claimed is:

1. A modular clamping system for holding a tool for rotation at high speeds, the system comprising:

a) a first clamping member having a first joining surface;

b) a second clamping member connected to the first clamping member in a non-positive manner and including a second joining surface engageable with the first joining surface; and c) a solid lubricating system of layers disposed on at least one of the first joining surface and the second joining surface and having an overall thickness of between about 0.1 $\mu$m and 1.0 $\mu$m, wherein the first joining surface and the second surface are not directly engageable with the tool, and wherein the solid lubricating system of layers comprises:

a first layer of a hard material; and a second layer of a solid lubricant.

2. The system of claim 1, wherein the solid lubricating system of layers comprises:

f) a third layer of a plastic material.

3. The system as recited in claim 2, wherein the plastic material is made of PTFE.

4. The system as recited in claim 1, wherein the layer of solid lubricant is made of $MoS_2$.

5. The system as recited in claim 1, wherein the hard material layer is made of TiC.

6. The system of claim 1, wherein the solid lubricating system of layers is disposed on each of the first joining surface and the second joining surface.

7. The system of claim 1, wherein the thickness of the solid lubricating system of layers is between 0.4 $\mu$m and 0.6 $\mu$m.

* * * * *

UNITED STATES PATENT AND TRADEMARK OFFICE
CERTIFICATE OF CORRECTION

PATENT NO. : 6,948,893 B2
DATED : September 27, 2005
INVENTOR(S) : Alber

It is certified that error appears in the above-identified patent and that said Letters Patent is hereby corrected as shown below:

<u>Title page,</u>
Item [75], Inventor, should read -- Roland Alber, Bitz (DE) --.

Signed and Sealed this

Twenty-fourth Day of January, 2006

JON W. DUDAS
*Director of the United States Patent and Trademark Office*